（12） United States Patent
Wang et al.

(10) Patent No.: US 11,208,341 B2
(45) Date of Patent: Dec. 28, 2021

(54) SEWAGE TREATMENT DEVICE AND METHOD FOR SYNCHRONOUSLY RECOVERING WATER AND ELECTRIC ENERGY

(71) Applicant: Jiangnan University, Wuxi (CN)

(72) Inventors: Xinhua Wang, Wuxi (CN); Manli Meng, Wuxi (CN); Shuyue Liu, Wuxi (CN)

(73) Assignee: JIANGNAN UNIVERSITY, Wuxi (CN)

( * ) Notice: Subject to any disclaimer, the term of this patent is extended or adjusted under 35 U.S.C. 154(b) by 0 days.

(21) Appl. No.: 16/944,255

(22) Filed: Jul. 31, 2020

(65) Prior Publication Data

US 2020/0361804 A1 Nov. 19, 2020

Related U.S. Application Data

(63) Continuation of application No. PCT/CN2019/113192, filed on Oct. 25, 2019.

(30) Foreign Application Priority Data

Jul. 25, 2019 (CN) .......................... 201910675244.2

(51) Int. Cl.
*C02F 9/00* (2006.01)
*C02F 1/44* (2006.01)
*C02F 3/12* (2006.01)

(52) U.S. Cl.
CPC ................ *C02F 9/00* (2013.01); *C02F 1/441* (2013.01); *C02F 1/445* (2013.01); *C02F 3/12* (2013.01);

(Continued)

(58) Field of Classification Search
CPC ....................................................... H01M 8/16
(Continued)

(56) References Cited

U.S. PATENT DOCUMENTS

| 7,709,113 | B2 * | 5/2010 | Logan | ..................... C02F 3/005 |
|  |  |  |  | 429/2 |
| 9,130,216 | B2 * | 9/2015 | He | .......................... H01M 8/16 |

(Continued)

FOREIGN PATENT DOCUMENTS

| CN | 105481180 A | 4/2016 |
| CN | 105776519 A | 7/2016 |

(Continued)

OTHER PUBLICATIONS

PCT/CN2019/113192 ISA210 ISR dated Apr. 13, 2020.

*Primary Examiner* — Nina Bhat
(74) *Attorney, Agent, or Firm* — IPRO, PLLC; Na Xu

(57) ABSTRACT

Provided is a sewage treatment device and method for synchronously recovering water and electric energy, belonging to the field of sewage treatment. The method includes the following steps: providing municipal sewage serving as influent water and a sludge and sewage mixed solution serving as a feed solution to enter a feed solution channel of a membrane component through a peristaltic pump, and allowing brine serving as a draw solution to enter a draw solution channel of the membrane component through a high pressure pump; allowing water to flow from the side of the feed solution to the side of the draw solution by means of the osmotic pressure difference between two sides of an FO membrane, and allowing the mixed draw solution with high pressure to push a turbine to rotate in an outflow process, so as to generate electric energy; and allowing the diluted draw solution to pass through a draw solution recovery system to obtain recycled water, and at the same time, allowing the (Continued)

concentrated draw solution to continue to be applied to the FO membrane.

15 Claims, 1 Drawing Sheet

(52) U.S. Cl.
CPC ...... *C02F 2209/03* (2013.01); *C02F 2209/05* (2013.01); *C02F 2303/10* (2013.01)

(58) Field of Classification Search
USPC ............. 429/2; 210/205, 601, 614; 204/252; 435/289.1, 299.1
See application file for complete search history.

(56) References Cited

U.S. PATENT DOCUMENTS

| | | | |
|---|---|---|---|
| 10,384,968 B2* | 8/2019 | Wang | B01D 61/005 |
| 2005/0255345 A1* | 11/2005 | Gerritse | H01M 8/16 |
| | | | 429/401 |
| 2008/0073288 A1* | 3/2008 | Fan | C02F 1/4691 |
| | | | 204/554 |
| 2010/0196742 A1* | 8/2010 | Nealson | H01M 8/16 |
| | | | 429/2 |
| 2013/0001162 A1* | 1/2013 | Yangali-Quintanilla | .................... |
| | | | C02F 1/445 |
| | | | 210/636 |
| 2013/0017414 A1* | 1/2013 | He | C02F 1/445 |
| | | | 429/2 |
| 2013/0017415 A1* | 1/2013 | He | H01M 8/16 |
| | | | 429/2 |
| 2013/0311887 A1* | 11/2013 | Nankani | G06F 3/0482 |
| | | | 715/730 |
| 2014/0224717 A1* | 8/2014 | Juby | H01M 8/16 |
| | | | 210/151 |
| 2015/0122709 A1* | 5/2015 | Sosa-Sanchez | C02F 11/04 |
| | | | 210/85 |
| 2015/0329397 A1* | 11/2015 | Blank | C12N 1/12 |
| | | | 435/257.1 |
| 2018/0297879 A1* | 10/2018 | Cho | C02F 3/307 |

FOREIGN PATENT DOCUMENTS

| | | |
|---|---|---|
| CN | 106007170 A | 10/2016 |
| CN | 109071275 A | 12/2018 |
| CN | 110272171 A | 9/2019 |
| KR | 20110045941 A | 5/2011 |
| KR | 20140073312 A | 6/2014 |

* cited by examiner

SEWAGE TREATMENT DEVICE AND METHOD FOR SYNCHRONOUSLY RECOVERING WATER AND ELECTRIC ENERGY

TECHNICAL FIELD

The disclosure relates to a sewage treatment device and method for synchronously recovering water and electric energy, belonging to the field of sewage treatment.

BACKGROUND

Serving as a novel sewage treatment technology combining biological treatment and membrane separation technologies, membrane bioreactors (MBRs) have the advantages of good and stable effluent water quality, small floor area, low residual sludge yield and so on, having been widely applied to the field of municipal sewage and industrial wastewater treatment, and being known as one of the most promising water treatment technologies in the $21_{st}$ century. However, the MBR still has the problems including effluent water quality to be further improved, high energy consumption and serious membrane pollution.

A forward osmosis membrane bioreactor (OMBR) is a novel MBR replacement process proposed by foreign scholars in 2008. It uses a novel forward osmosis (FO) membrane to replace a pressure-driven membrane separation process in a traditional MBR, and is a novel process that combines biological treatment and the FO membrane. According to the relative position relationship between the FO membrane component and the bioreactor, the OMBR can be divided into an immersed OMBR (the FO membrane component is positioned inside the bioreactor) and an external OMBR (the FO membrane component is positioned outside the bioreactor). The immersed OMBR has a small floor area, a circulating pump of a sludge and sewage mixed solution is omitted, but the FO membrane component is not easy to disassemble and the membrane pollution control effect is relatively poor. The external OMBR is convenient to disassemble, has good hydraulic conditions and is easier to control membrane pollution, but increases the floor area. The pushing force of the FO membrane is the osmotic pressure difference, an FO process does not need to apply external pressure as a driving force, and water molecules can spontaneously penetrate from the part of the feed solution with high water chemical potential to the part of the draw solution with low water chemical potential. Compared with the pressure-driven process, the FO membrane has a smaller membrane pollution tendency. Because the FO membrane has better interception performance for pollutants, the effluent water quality of the OMBR is better than that of the traditional MBR, and the effluent water can be directly recycled. It is precisely because of the characteristics of better effluent water quality, smaller membrane pollution tendency and the like, the OMBR has received more and more attentions.

At present, a commercial FO membrane includes two layers, wherein one layer is an active layer having an interception effect, and the other layer is a support layer having a support effect. The active layer is relatively thin and dense and has a strong anti-pollution ability, and the support layer is relatively thick and porous and is prone to membrane pollution. Therefore, there are two membrane orientations during the operation of the FO membrane, wherein one orientation is that the active layer faces the feed solution (AL-FS), and the other orientation is that the support layer faces the feed solution (AL-DS). Compared with the AL-DS, for the AL-FS, the membrane pollution tendency is smaller, but the membrane flux is smaller. When an existing OMBR operates, considering that the FO membrane faces the active sludge containing various pollutants, in order to alleviate the membrane pollution, the AL-FS orientation is generally adopted.

In fact, during the operation of the OMBR, there is salinity gradient energy on two sides of the FO membrane. The salinity gradient energy is the energy generated when different solutions are mixed. Compared with solar energy and wind energy, the salinity gradient energy is less affected by meteorological and geographical conditions, and has huge reserves in the ocean. Although there is salinity gradient energy in an FO process, since the amount of osmotic water generated in an FO sewage treatment process is too small, the corresponding power density (equal to the pressure applied to the side of the draw solution multiplied by the water yield) is small, and the salinity gradient energy is difficult to recover. Pressure retarded osmosis (PRO) is a novel membrane process for producing energy by means of salinity gradient energy. Compared with the FO membrane, the PRO applies the external pressure less than the osmotic pressure difference to the side of the draw solution, which increases the power density generated in the osmosis process, so that the salinity gradient energy can be recovered. Specifically, in the PRO, water flows from the side of the feed solution (with low salinity) to the side of the draw solution (with high salinity) through a semi-permeable membrane, and due to the constant volume of the side of the draw solution of a PRO component, the draw solution and feed solution mixture has higher pressure than the original draw solution, which can push a turbine to generate electricity in an outflow process. At present, the PRO mainly treats surface water such as river water, lake water and seawater, which lacks applications in sewage treatment. In addition, due to low concentration of pollutants in the surface water, the concentration of the pollutants in the feed solution during the PRO operation and the after-treatment thereof are not involved.

SUMMARY

When an existing OMBR operates, the draw solution needs to be recovered by means of technologies such as reverse osmosis and membrane distillation, which causes high energy consumption and affects the economic feasibility of the technologies. Although there is salinity gradient energy in an FO process, since the amount of osmotic water generated in an FO sewage treatment process is too small, the corresponding power density (equal to the pressure applied to the side of the draw solution multiplied by the water yield) is small, and the salinity gradient energy is difficult to recover.

When an existing PRO operates, it is actually a concentration process for the feed solution, that is, water enters the draw solution through an FO membrane, and pollutants are intercepted on the side of the feed solution, which leads to the problems of enrichment of pollutants such as carbon, nitrogen and phosphorus in the feed solution and complicated subsequent treatment.

In order to solve the above problems, the disclosure provides a process combining OMBR and PRO energy production, and establishes a novel sewage treatment technology based on synchronous recovery of water and electric energy. On the basis of keeping the advantages of the OMBR, additional electric energy is obtained, and the energy consumption for after-treatment of the draw solution is reduced.

A first objective of the disclosure is to provide a sewage treatment device for synchronously recovering water and electric energy. The device includes an influent water pool, a bioreactor, an FO membrane component, a turbine, a draw solution pool and a draw solution recovery system. The influent water pool is connected with the bioreactor, the FO membrane component includes a draw solution channel, a feed solution channel and an FO membrane, the FO membrane separates the draw solution channel from the feed solution channel, both an inlet of the feed solution channel and an outlet of the feed solution channel are connected with the bioreactor, the draw solution pool is connected with an inlet of the draw solution channel, an outlet of the draw solution channel is connected with the draw solution pool through the turbine, and the draw solution pool is connected with the draw solution recovery system.

In an implementation of the disclosure, a pump is installed on a pipeline where the influent water pool is connected with the bioreactor.

In an implementation of the disclosure, a pump is installed on a pipeline where the bioreactor is connected with the inlet of the feed solution channel.

In an implementation of the disclosure, a high-pressure pump is installed on a pipeline where the draw solution pool is connected with the inlet of the draw solution channel.

In an implementation of the disclosure, an aeration pipe is installed at the lower part of the bioreactor, and one end of an air pump is connected with the aeration pipe.

In an implementation of the disclosure, the draw solution recovery system includes a conductivity meter, a high pressure pump and a reverse osmosis component, wherein the draw solution pool, the high pressure pump, the reverse osmosis component and the draw solution pool are sequentially connected to form a cycle, the conductivity meter is connected with the high pressure pump and controls the turning-on and turning-off of the high pressure pump, and a detection end of the conductivity meter is positioned inside the draw solution pool.

In an implementation, the membrane component is made of stainless steel or organic plastic materials, and the FO membrane component further includes a gasket positioned on one side of the FO membrane.

In an implementation of the disclosure, the FO membrane is any one of a cellulose acetate (CTA) membrane, a polyamide (TFC) membrane, an aquaporin membrane or a polyether sulfone resin (PES) membrane.

In an implementation of the disclosure, the FO membrane includes a support layer and an active layer, and the active layer faces the draw solution.

A second objective of the disclosure is to provide a sewage treatment method for synchronously recovering water and electric energy. The above-mentioned sewage treatment device is used by the method to treat sewage.

In an implementation of the disclosure, the sewage is municipal sewage, and water quality indexes are as follows: COD: 200-500 mg/L, $NH_4^+$—N: 20-50 mg/L, TN: 30-50 mg/L, and TP: 2-7 mg/L.

In an implementation of the disclosure, the method specifically includes the following steps:

1) enabling municipal sewage serving as influent water to enter the bioreactor so as to be mixed with active sludge, pumping the sludge and sewage mixture obtained by mixing into the feed solution channel of the FO membrane through a pump, enabling a draw solution to enter the draw solution channel in the membrane component through the high pressure pump, and enabling water to flow from the feed solution channel to the draw solution channel by means of the osmotic pressure difference between two sides of the FO membrane; and 2) at the same time, applying a certain pressure to the side of the draw solution channel, enabling the diluted draw solution to pass through the turbine and push the turbine to rotate, so as to generate electric energy, and when the concentration of the draw solution is too low, starting the draw solution recovery system, and concentrating and recovering the draw solution by a reverse osmosis component to obtain water.

In an implementation of the disclosure, the cycle rate of the sludge and sewage mixed solution is 0.1-0.5 L/min.

In an implementation of the disclosure, the inoculated sludge is active sludge in which the SS is 3-9 g/L.

In an implementation of the disclosure, the draw solution is a 0.5-4 M NaCl, $MgCl_2$, KCl or $CaCl_2$ solution.

In an implementation of the disclosure, the pressure applied to the side of the draw solution channel is less than the osmotic pressure on two sides of the FO membrane.

In an implementation of the disclosure, the pressure applied to the side of the draw solution channel is 4-8 bars.

In an implementation of the disclosure, when the concentration of the draw solution is too low, it means that the osmotic pressure difference of the FO membrane is less than the pressure applied to the side of the draw solution channel.

Compared with the prior art, the disclosure has the following beneficial technical effects:

(1) The disclosure constructs a novel sewage treatment device and method for synchronously recovering water and electric energy by combining the advantages of OMBR and PRO energy production, recovering sewage by means of biological treatment and FO membrane interception and enabling the mixed draw solution with high pressure to push the turbine to rotate to generate electricity in the outflow process, so that the energy utilization is more sufficient.

(2) The concentrated water obtained by the FO membrane of the disclosure does not need to be incinerated or further chemically treated, but only needs to be returned to the bioreactor, and then, pollutants such as carbon, nitrogen and phosphorus can be removed through the biological action, thereby solving the problem of enrichment of the pollutants such as carbon, nitrogen and phosphorus when an existing PRO operates. The method of the disclosure is more economical and environmentally-friendly in treatment.

DETAILED DESCRIPTION

Figure 1:
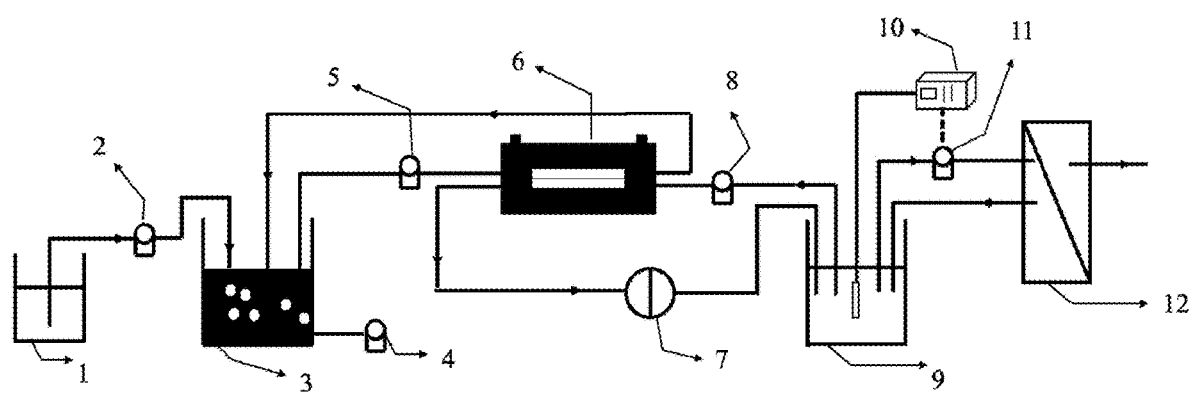
FIG. 1 is a schematic structural diagram of an implementation of a sewage treatment device for synchronously recovering water and electric energy of the disclosure. In the figure, 1 denotes an influent water pool, 2 denotes a peristaltic pump, 3 denotes a bioreactor, 4 denotes an air pump, 5 denotes a peristaltic pump, 6 denotes an FO membrane component, 7 denotes a turbine, 8 denotes a high pressure pump, 9 denotes a draw solution pool, 10 denotes a conductivity meter, 11 denotes a high pressure pump, 12 denotes a reverse osmosis component, 17 denotes a draw solution recovery system.

The specific implementations of the disclosure are further described in detail below with reference to the examples.

The following examples are intended to illustrate the disclosure but are not intended to limit the scope of the disclosure.

1. Measurement method of COD: fast digestion spectrophotometry.
2. Measurement method of $NH_4^+$—N: Berthebt method.
3. Measurement method of TN: potassium persulfate oxidation-ultraviolet spectrophotometry.
4. Measurement method of TP: potassium persulfate digestion-molybdenum antimony anti-spectrophotometry.
5. Measurement method of average water flux: expressed by the amount of water passing through a unit membrane area in a unit time.
6. Measurement method of average electricity generation power density: expressed by the amount of electricity generated on a unit membrane area.
7. Measurement method of membrane surface pollutants: all pollutants are put into a crucible and evaporated to a constant weight at 600° C. to obtain the total weight of the remaining solids.

Example 1

With reference to the FIG. 1 and the FIG. 2, a sewage treatment device for synchronously recovering water and electric energy of the disclosure will be described in detail. The device of the disclosure includes an influent water pool 1, a bioreactor 3, an FO membrane component 6, a turbine 7, a draw solution pool 9 and a draw solution recovery system 17. The influent water pool 1 is connected with the bioreactor 3 through a peristaltic pump 2. The FO membrane component 6 includes a draw solution channel 14, a feed solution channel 13, gaskets 15 and an FO membrane 16. The gaskets and the FO membrane are arranged in parallel and separate the draw solution channel from the feed solution channel. Both an inlet of the feed solution channel and an outlet of the feed solution channel are connected with the bioreactor 3. The draw solution pool 9 is connected with an inlet of the draw solution channel through a high pressure pump 8, and an outlet of the draw solution channel is connected with the draw solution pool 9 through the turbine 7. The draw solution recovery system 17 includes a conductivity meter 10, a high pressure pump 11 and a reverse osmosis component 12, and the draw solution pool 9, the high pressure pump 11, the reverse osmosis component 12 and the draw solution pool 9 are sequentially connected to form a cycle. The conductivity meter 10 is connected with the high pressure pump 11 and is configured to control the turning-on and turning-off of the high pressure pump. A detection end of the conductivity meter 10 is positioned inside the draw solution pool 9.

Further, an aeration pipe is installed at the lower part of the bioreactor 3, and one end of an air pump is connected with the aeration pipe.

Further, the membrane component is made of stainless steel or organic plastic materials, and the FO membrane is any one of a cellulose acetate (CTA) membrane, a polyamide (TFC) membrane, an aquaporin membrane or a polyether sulfone resin (PES) membrane.

Figure 2:
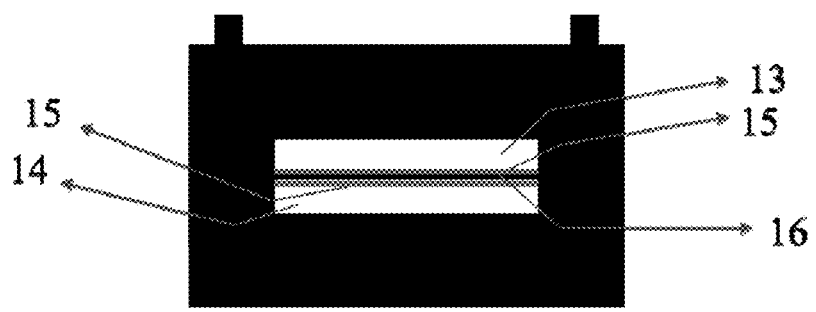
FIG. 2 is a schematic structural diagram of an FO membrane component. In the figure, 13 denotes a feed solution channel, 14 denotes a draw solution channel, 15 denotes a gasket, 16 denotes an FO membrane.

It can be seen from the FIG. 2 that the FO membrane component includes a support layer and an active layer, and the active layer faces the draw solution.

The operating principle of the above-mentioned device is as follows: municipal sewage serving as influent water enters the bioreactor so as to be mixed with active sludge, the sludge and sewage mixture obtained by mixing is pumped into the feed solution channel of the FO membrane through a pump, a draw solution enters the draw solution channel in the membrane component through the high pressure pump, and water flows from the feed solution channel to the draw solution channel by means of the osmotic pressure difference between two sides of the FO membrane; at the same time, a certain pressure is applied to the side of the draw solution channel, and the diluted draw solution passes through the turbine and pushes the turbine to rotate, so as to generate electric energy; and when the concentration of the draw solution is too low, the draw solution recovery system is started, and the draw solution is concentrated and recovered by a reverse osmosis component to obtain water.

Example 2

The municipal sewage is treated by the device shown in FIG. 1.

In view of the structure of FO (one layer is an active layer having an interception effect, and the other layer is a support layer having a support effect. The active layer is relatively thin and dense and has a strong anti-pollution ability, and the support layer is relatively thick and porous and is prone to membrane pollution), and the condition that the FO membrane in the disclosure faces the active sludge containing various pollutants, in order to alleviate FO membrane pollution, when the OMBR of the present example operates, an AL-FS orientation is adopted (the active layer faces the feed solution).

The influent water is municipal sewage, and the water quality is as follows: COD: 350±12.2 mg/L, $NH_4^+$—N: 24.88±1.50 mg/L, TN: 38.24±1.68 mg/L, and TP: 2.08±0.13 mg/L. In the bioreactor, the SS (suspended solid) is 3 g/L active sludge, the draw solution is 2 M NaCl, the pressure applied to the side of the draw solution is 6 bars, the membrane orientation is AL-FS (the active layer faces the feed solution), and the operating time is 24 h.

The effluent water quality is as follows: COD: 10±2.45 mg/L, $NH_4^+$—N: 4.41±0.40 mg/L, TN: 4.49±0.53 mg/L, and TP: 0. The average water flux is 7.79 LMH, and the average electricity generation power density is 1.4 $W/m^2$.

It can be seen that, according to a conventional practice (that is, the FO membrane orientation is AL-FS), the finally obtained average water flux is only 7.79 LML, and the average electricity generation power density is only 1.4 $W/m^2$.

Example 3

In order to further increase the average electricity generation power, the inventors try to adopt the unconventional FO membrane orientation, that is, AL-DS (the active layer faces the draw solution), to conduct experiments.

In the method of the present example, the influent water is municipal sewage, and the water quality is as follows: COD: 350±12.2 mg/L, $NH_4^+$—N: 24.88±1.50 mg/L, TN: 38.24±1.68 mg/L, and TP: 2.08±0.13 mg/L. In the bioreactor, the SS is 3 g/L active sludge, the draw solution is 2 M NaCl, the pressure applied to the side of the draw solution is 6 bars, the membrane orientation is AL-DS (the active layer faces the draw solution), and the operating time is 4 h.

The effluent water quality is as follows: COD: 10±1.51 mg/L, $NH_4^+$—N: 5.12±0.90 mg/L, TN: 5.53±1.21 mg/L, and TP: 0. The average water flux is 12.19 LML, and the average electricity generation power density is 2.2 $W/m^2$.

It can be found that when the active layer faces the draw solution (the membrane orientation is AL-DS), under the same conditions, the average water flux is 12.19 LMH and the average electricity generation power density is 2.2 W/m² which are 1.57 times that of Example 2. In addition, during 24 h of operation, the water flux and power density are always higher than the membrane flux and power density of Example 2. Compared with the AL-FS, during operating in the AL-DS orientation, the pollution level of the FO membrane is similar to that in Example 2, and there is no obvious blockage. It can be seen that, when the membrane orientation is AL-DS, an optimal operating effect can be obtained.

Example 4

In the method of the present example, the influent water is municipal sewage, and the water quality is as follows: COD: 330±10.1 mg/L, $NH_4^+$—N: 24.88±1.50 mg/L, TN: 38.24±1.68 mg/L, and TP: 2.08±0.13 mg/L. In the bioreactor, the SS is 3 g/L active sludge, the draw solution is 2 M NaCl, the pressure applied to the side of the draw solution is 0 bar, the membrane orientation is AL-DS (the active layer faces the draw solution), and the operating time is 4 h.

The effluent water quality is as follows: COD: 12±2.45 mg/L, $NH_4^+$—N: 5.11±0.30 mg/L, TN: 4.63±0.38 mg/L, and TP: 0. The average water flux is 13.54 LMH, and the average electricity generation power density is 0 W/m².

It can be found that when no pressure is applied to the side of the draw solution, although the flux is also stable, no electricity is generated. By means of analysis of membrane surface pollutants, it is found that the membrane surface pollutants after pressurized operation are 0.78 g/m², while the membrane surface pollutants without pressurized operation are 1.52 g/m². It can be seen that, the membrane surface pollutants after pressurized operation are significantly reduced, which indicates that the membrane pollution after pressurized operation is lighter than the membrane pollution without pressurized operation.

Example 5

Referring to the method of Example 3, the difference is that the pressure applied to the side of the draw solution is changed, the pressure is 0, 4, 6, 8 and 12 bars respectively, the other conditions are the same as those in Example 3, and results are shown in Table 1. It can be seen from Table 1 that as the pressure increases, the average electricity generation power density is higher. However, when the pressure is 12 bars which is too high, the membrane is deformed, the membrane pollution is aggravated, and the system is unstable. Therefore, preferably, the pressure of the high pressure pump is 4-8 bars.

TABLE 1

| Pressure applied to side of draw solution (bar) | Effluent water COD (mg/L) | Effluent water $NH_4^+$-N (mg/L) | Effluent water TN (mg/L) | Effluent water TP (mg/L) | Average water flux (LMH) | Average electricity generation power density (W/m²) |
|---|---|---|---|---|---|---|
| 0 | 12 ± 2.45 | 5.11 ± 0.30 | 4.63 ± 0.38 | 0 | 13.54 | 0 |
| 4 | 11.54 ± 2.39 | 4.99 ± 0.36 | 5.95 ± 0.24 | 0 | 10.55 | 1.17 |
| 6 | 10 ± 2.45 | 5.12 ± 0.90 | 5.53 ± 1.21 | 0 | 12.19 | 2.2 |
| 8 | 11.98 ± 1.58 | 4.53 ± 0.37 | 6.02 ± 0.87 | 0 | 11.88 | 2.64 |

What is claimed is:

1. A sewage treatment device for synchronously recovering water and electric energy, comprising:
    an influent water pool,
    a bioreactor,
    a forward osmosis (FO) membrane component,
    a turbine,
    a draw solution pool, and
    a draw solution recovery system,
    wherein the influent water pool is connected with the bioreactor,
    wherein the FO membrane component comprises a draw solution channel, a feed solution channel, and an FO membrane,
    wherein the FO membrane separates the draw solution channel from the feed solution channel,
    wherein both an inlet of the feed solution channel and an outlet of the feed solution channel are connected with the bioreactor,
    wherein the draw solution pool is connected with an inlet of the draw solution channel,
    wherein an outlet of the draw solution channel is connected with the draw solution pool through the turbine,
    wherein the draw solution pool is connected with the draw solution recovery system,
    wherein a high pressure pump is installed on a pipeline where the draw solution pool is connected with the inlet of the draw solution channel,
    wherein the FO membrane comprises a support layer and an active layer, and
    wherein the active layer faces a draw solution.

2. The sewage treatment device according to claim 1, wherein a second pump and a second pipeline fluidly connects the influent water pool with the bioreactor.

3. The sewage treatment device according to claim 1, wherein a third pump and a third pipeline fluidly connects the bioreactor with the inlet of the feed solution channel.

4. The sewage treatment device according to claim 1, wherein an aeration pipe fluidly connects a lower part of the bioreactor with an air pump.

5. The sewage treatment device according to claim 1, wherein the draw solution recovery system comprises in sequential fluid connection:
    a conductivity meter,
    a high pressure pump, and
    a reverse osmosis component,
    wherein said conductivity meter is disposed within the draw solution pool.

6. The sewage treatment device according to claim 1, wherein the FO membrane component comprises stainless steel or an organic plastic material, and wherein the FO membrane component further comprises gaskets positioned on two sides of the FO membrane.

7. The sewage treatment device according to claim 1, wherein the FO membrane is selected from the group consisting of: a cellulose acetate membrane, a polyamide membrane, an aquaporin membrane, and a polyether sulfone resin membrane.

8. A method of sewage treatment for synchronously recovering water and electric energy, comprising:
    providing a sewage treatment device, which comprises:
        an influent water pool,
        a bioreactor,
        a forward osmosis (FO) membrane component,
        a turbine,
        a draw solution pool, and
        a draw solution recovery system,
        wherein the influent water pool is connected with the bioreactor, wherein the FO membrane component comprises a draw solution channel, a feed solution channel, and an FO membrane, wherein the FO membrane separates the draw solution channel from the feed solution channel, wherein both an inlet of the feed solution channel and an outlet of the feed solution channel are connected with the bioreactor, wherein the draw solution pool is connected with an inlet of the draw solution channel, wherein an outlet of the draw solution channel is connected with the draw solution pool through the turbine, wherein the draw solution pool is connected with the draw solution recovery system, wherein a high pressure pump is installed on a pipeline where the draw solution pool is connected with the inlet of the draw solution channel, wherein the FO membrane comprises a support layer and an active layer, and wherein the active layer faces a draw solution, providing municipal sewage as influent water that enters the bioreactor so as to be mixed with active sludge, pumping the sludge and sewage mixture into the feed solution channel of the FO membrane through a pump, flowing the draw solution such that it enters the draw solution channel in the membrane component through the high pressure pump, and flowing water from the feed solution channel to the draw solution channel by means of an osmotic pressure difference between two sides of the FO membrane; and at the same time, applying a pressure to a side of the draw solution channel, passing a diluted draw solution to through the turbine thereby pushing the turbine such that it rotates, so as to generate electric energy, and starting the draw solution recovery system when a concentration of the draw solution is too low, and concentrating and recovering the draw solution by a reverse osmosis component to obtain water.

9. The sewage treatment method according to claim 8, wherein the sewage is municipal sewage.

10. The sewage treatment method according to claim 9, wherein the municipal sewage comprises water quality indexes selected from the group consisting of: COD: 200-500 mg/L, $NH_4^+$—N: 20-50 mg/L, TN: 30-50 mg/L, and TP: 2-7 mg/L.

11. The sewage treatment method according to claim 8, wherein the active sludge comprises suspended solids at a concentration of between 3 and 9 g/L.

12. The sewage treatment method according to claim 8, wherein the draw solution comprises 0.5 M-4 to 4 M NaCl, 0.5 M to 4 M $MgCl_2$, 0.5 M to 4 M KCl, or 0.5 M to 4 M $CaCl_2$.

13. The sewage treatment method according to claim 8, wherein the pressure applied to the side of the draw solution channel is less than an osmotic pressure on two sides of the FO membrane.

14. The sewage treatment method according to claim 8, wherein the pressure applied to the side of the draw solution channel is 4 bars to 8 bars.

15. The sewage treatment method according to claim 8, wherein the concentration of the draw solution is too low when the osmotic pressure difference of the FO membrane is less than the pressure applied to the side of the draw solution channel.

* * * * *